(12) United States Patent
McGrane (10) Patent No.: US 8,403,229 B2
(45) Date of Patent: Mar. 26, 2013

(54) SECURE CARD PACKAGING WITH CONCEALED ACTIVATION FIELD

(75) Inventor: Russell McGrane, Highlands Ranch, CO (US)

(73) Assignee: CPI Card Group—Colorado, Inc., Littleton, CO (US)

( * ) Notice: Subject to any disclaimer, the term of this patent is extended or adjusted under 35 U.S.C. 154(b) by 0 days.

(21) Appl. No.: 12/901,015

(22) Filed: Oct. 8, 2010

(65) Prior Publication Data

US 2011/0084144 A1   Apr. 14, 2011

Related U.S. Application Data

(60) Provisional application No. 61/249,937, filed on Oct. 8, 2009.

(51) Int. Cl.
G06K 19/02 (2006.01)

(52) U.S. Cl. ........ 235/488; 235/487; 235/380; 235/486; 283/61; 283/62; 705/18

(58) Field of Classification Search .................. 235/488, 235/487, 380, 486; 283/61, 62; 705/18
See application file for complete search history.

(56) References Cited

U.S. PATENT DOCUMENTS

| | | | |
|---|---|---|---|
| 5,091,261 A | 2/1992 | Casey et al. | |
| 5,360,116 A | 11/1994 | Schmiletzky | |
| 5,427,832 A | 6/1995 | Longtin | |
| 5,760,381 A | 6/1998 | Stich et al. | |
| 5,777,305 A | 7/1998 | Smith et al. | |
| 5,918,909 A | 7/1999 | Fiala et al. | |
| 6,010,784 A | 1/2000 | Peterson | |
| 6,224,108 B1 | 5/2001 | Klure | |
| 6,270,012 B1 | 8/2001 | Dawson | |
| 6,315,206 B1 * | 11/2001 | Hansen et al. | 235/487 |
| 6,328,341 B2 * | 12/2001 | Klure | 283/62 |
| 6,439,613 B2 | 8/2002 | Klure | |
| 6,454,165 B1 | 9/2002 | Dawson | |
| 6,543,809 B1 | 4/2003 | Kistner et al. | |
| 6,619,480 B2 | 9/2003 | Smith | |
| 6,715,795 B2 | 4/2004 | Klure | |
| 6,957,737 B1 * | 10/2005 | Frederickson et al. | 206/449 |
| 7,000,844 B1 | 2/2006 | Smith | |
| 7,267,284 B1 | 9/2007 | Smith | |
| 2003/0004889 A1 * | 1/2003 | Fiala et al. | 705/64 |
| 2005/0071233 A1 * | 3/2005 | Nemeth et al. | 705/18 |
| 2005/0091115 A1 | 4/2005 | Arthur | |
| 2006/0261154 A1 | 11/2006 | Arthur et al. | |
| 2007/0063052 A1 * | 3/2007 | Chakiris et al. | 235/486 |
| 2007/0262160 A1 * | 11/2007 | Narlinger et al. | 235/493 |
| 2007/0278296 A1 | 12/2007 | Dwyre et al. | |
| 2009/0078590 A1 | 3/2009 | Smith | |
| 2009/0099964 A1 * | 4/2009 | Calderon Gonzalez | 705/41 |
| 2009/0254484 A1 * | 10/2009 | Forero et al. | 705/68 |
| 2010/0219099 A1 * | 9/2010 | Schmitt et al. | 206/776 |

* cited by examiner

*Primary Examiner* — Allyson Trail
(74) *Attorney, Agent, or Firm* — Marsh Fischmann & Breyfogle LLP (57) ABSTRACT

Improved secure card packaging is provided which includes a concealed region within which an activation data field corresponding with a transaction card is located. The corresponding transaction card may be retainably disposed so that a proprietary account data field thereupon is not readable when the concealed region is selectively accessed. Upon accessing the concealed region, the activation data field may be read to activate the transaction card, e.g. at a point-of-sale location. Locating the activation data field within a concealed region reduces tampering risks. Tampering is further reduced by retained disposition of the transaction card so that the proprietary account data field is not readable prior to a purchase and card activation transaction.

26 Claims, 7 Drawing Sheets

SECURE CARD PACKAGING WITH CONCEALED ACTIVATION FIELD

RELATED APPLICATIONS

This application claims priority to U.S. Provisional Application Ser. No. 61/249,937, filed Oct. 8, 2009, entitled "SECURE CARD PACKAGING WITH CONCEALED ACTIVATION FIELD", the entirety of which is hereby incorporated by reference.

FIELD OF THE INVENTION

The present invention relates to point-of-sale (P-O-S) activated transaction cards, and more particularly, to improved secure card packaging to reduce incidents of fraud via third-party tampering.

BACKGROUND OF THE INVENTION

The sale of debit cards, gift cards, telephone cards and other transaction cards at retail locations is widespread and increasing. Typically, such transaction cards are packaged, distributed and displayed at point-of-sale (P-O-S) locations in an inactive state. In turn, in conjunction with a purchase transaction, a corresponding transaction card is activated at a P-O-S location. Typically, activation entails reading a machine-readable card activation marking on the transaction card and/or packaging therefor, correlating the read data with an account that corresponds with the card, and activating the account card for use.

Unfortunately, third-party tampering with transaction cards and packaging therefor has presented continuing design challenges. For example, in one tampering scheme third-parties have modified card activation markings on packaging so that, upon purchase of a modified package, an unintended card account (e.g., an account that is accessible by the third-party) is activated. In another tampering scheme, third-parties obtain proprietary account data from transaction cards at a P-O-S location, which proprietary account data may then be fraudulently employed after purchase and activation of the cards to access account funds corresponding with the transaction cards. As a result of such tampering schemes, various approaches have been proposed to enhance secure card packaging and reduce incidents of tampering.

SUMMARY OF THE INVENTION

The primary objective of the present invention is to provide secure card packaging in a manner that reduces risk of third-party tampering. A related objective is to provide for improved secure card packaging in a manner that is user-friendly.

In one aspect, an improved secure card package comprises a concealed region, a separable portion manipulable by a user for selectively accessing the concealed region, and a transaction card retainably disposed so that a proprietary account data field on the transaction card is not readable when the concealed region is selectively accessed. An activation data field may be located within the concealed region, wherein the activation data field is only readable to activate the transaction card when the concealed region is selectively accessed (e.g., via the separable portion).

As may be appreciated, the provision of an activation data field within a concealed region reduces tampering risk since the activation data field is not accessible without detection by third-parties prior to the time of an intended activation event at a point-of-sale (P-O-S) location. That is, in typical applications, a purchaser of the secure card package will remove the package from a product display location and transport the package to a purchase check-out at the point of sale location. In turn, sales personnel will selectively access the concealed region of the secure card package and read the activation data field in conjunction with the sale of the secure card package. Any prior and unintended access to the concealed region should be evident to such sales personnel and/or purchasers, thereby indicating that a tampering event may have occurred and alerting such individuals that the corresponding secure card package should not be activated or otherwise sold/purchased.

In addition to the foregoing, it may also be appreciated that risk of third-party tampering is further reduced by the improved secure card package due to the retained disposition of a transaction card so that a proprietary account data field on the transaction card is not readable when the concealed region is accessed (e.g., at a point of sale prior to activation utilizing the activation data field located within the enclosed region). In turn, parties other than the purchaser of the secure card package are restricted from reading proprietary account data prior to and throughout the purchase of the secure card package. In this regard, if a transaction card is not retainably disposed so that the proprietary account data field thereupon is unreadable at the time of sale, such condition provides an indication to sales personnel and/or a purchaser that the secure card package may have been tampered with. In turn, the sale and activation of the secure card package should not proceed.

In one approach, the concealed region may be defined by at least a portion of an internal, enclosed region of the secure card package, and the transaction card may be located within the enclosed region of the secure card package. In such approach, the activation data field may be located either on the transaction card (e.g., on a side of a transaction card that is readable upon accessing the concealed region), or on a panel portion of the secure card package that is readable upon accessing the concealed region. In one embodiment, the transaction card may be detachably interconnected to a panel portion of the package (e.g. via an adhesive) so as to render the proprietary account data field unreadable when the enclosed region is accessed. In another embodiment, the transaction card may be disposed within the concealed region so that a proprietary account data field thereupon is blocked-from-view and rendered unreadable by an opaque panel portion of the package after the concealed region is accessed. For example, a proprietary account data field and a machine-readable, activation data field may be provided on a first side of a transaction card, wherein only the activation data field is exposed on the first side for reading/activation at a point-of-sale purchase location.

In another approach, the concealed region may be defined by an internal, first enclosed region of the secure card package that is accessible via the separable portion of the package, and the transaction card may be located within a separate, internal, second enclosed region of the secure card package. In this arrangement, the activation data field within the first enclosed region may be selectively accessed at a point of sale location so as to activate the transaction card in conjunction with purchase of the secure card package, while the transaction card may be retainably disposed in the second enclosed region (e.g., loosely retained within a separate enclosed pocket) throughout such purchase so that the proprietary account data field on the transaction card is not readable. In turn, at some point after purchase, a purchaser may selectively access the second enclosed region and remove the transaction card for use.

In yet another approach, the concealed region and activation data field may underlie a separable portion that is defined by a removable label. In one embodiment, the activation data field may be located on a panel portion of the secure card package that is readable upon removing the label. In other embodiments, the activation data field may be located on either the transaction card or on a panel portion of the secured card package that is readable through a window of the secure card package that is exposed upon removal of the label. In conjunction with this approach, removable labels may be employed which, after initial positioning as part of a secure card package, will reflect any subsequent repositioning, thereby alerting sales personnel and/or consumers that tampering may have occurred.

The activation data field comprising the improved secure card package may include a machine readable marking or a human-readable marking. By way of example, machine-readable markings may comprise a barcode or a magnetic stripe for automated reading and card activation.

In some implementations, the proprietary data account field may comprise human-readable data, e.g., alphabetic, numeric, alphanumeric and/or other like indicia to directly identify a specific transaction card account and complete a given transaction after activation. In this regard, after card activation a machine-readable account marking or embedded integrated circuit (IC) chip included with the card may be read to complete a given transaction using the card. For example, in one arrangement, a proprietary data account field may comprise human-readable data on one side of a transaction card. In such arrangement a machine-readable marking (e.g. a barcode or magnetic stripe) may be provided on another side of the transaction card or an embedded IC chip may be included, wherein the machine-readable marking or element is readable to obtain indicator data that may be employed by a proprietary database controller to identify a specific proprietary transaction account, e.g. via a stored relational database that correlates otherwise meaningless indicator data with a specific transaction account. In other implementations, the proprietary data account field may comprise a machine-readable marking or embedded IC chip that is readable to directly identify a specific transaction account.

In various implementations, the secure card package may include opposing panel portions to define at least a portion of the concealed region within which the activation data field is located. In turn, the opposing panel portions may be interconnected along an adjoinment region. In one approach, the separable portion of the secure card package may be located on one of the opposing panel portions. In another approach, the separable portion of the secure card package may be located along the adjoinment region. The separable portion of the secure card package may be defined by any of a number of approaches. By way of example, in one embodiment a perforated panel portion may be provided to define the separable portion. In another approach, a pull strip panel portion may be included. In yet other approaches the separable portion may be defined by a removable label, as noted above.

In another aspect, an improved method for handling a secure card package, comprising a transaction card, at a point-of-sale location is provided. The method may include the steps of accessing a concealed region of the secure card package at a point-of-sale location, wherein an activation data field associated with the transaction card is located within the concealed region. In turn, the method includes the step of reading the activation data field at the point-of-sale location after the accessing step, wherein the transaction card is activated. Of note, the method may further include the step of retaining the transaction card in a first position throughout the accessing step, wherein a proprietary data account field on the transaction card is not readable in the first position.

In some embodiments, the accessing step of the method may include manipulating a separable portion of the secure card package to define an opening for accessing the activation field. In this regard, the separable portion may include at least one of a perforated panel portion, a pull strip panel portion and/or a removable label.

In various implementations, the activation field may include a machine-readable marking, wherein the reading step of the method includes employing a machine for automated reading of the activation field. By way of example, the machine-readable marking may comprise one of a barcode and a magnetic stripe.

Numerous additional features and advantages of the present invention will become apparent to those skilled in the art upon consideration of the embodiment descriptions provided hereinbelow.

DETAILED DESCRIPTION

Figure 1:
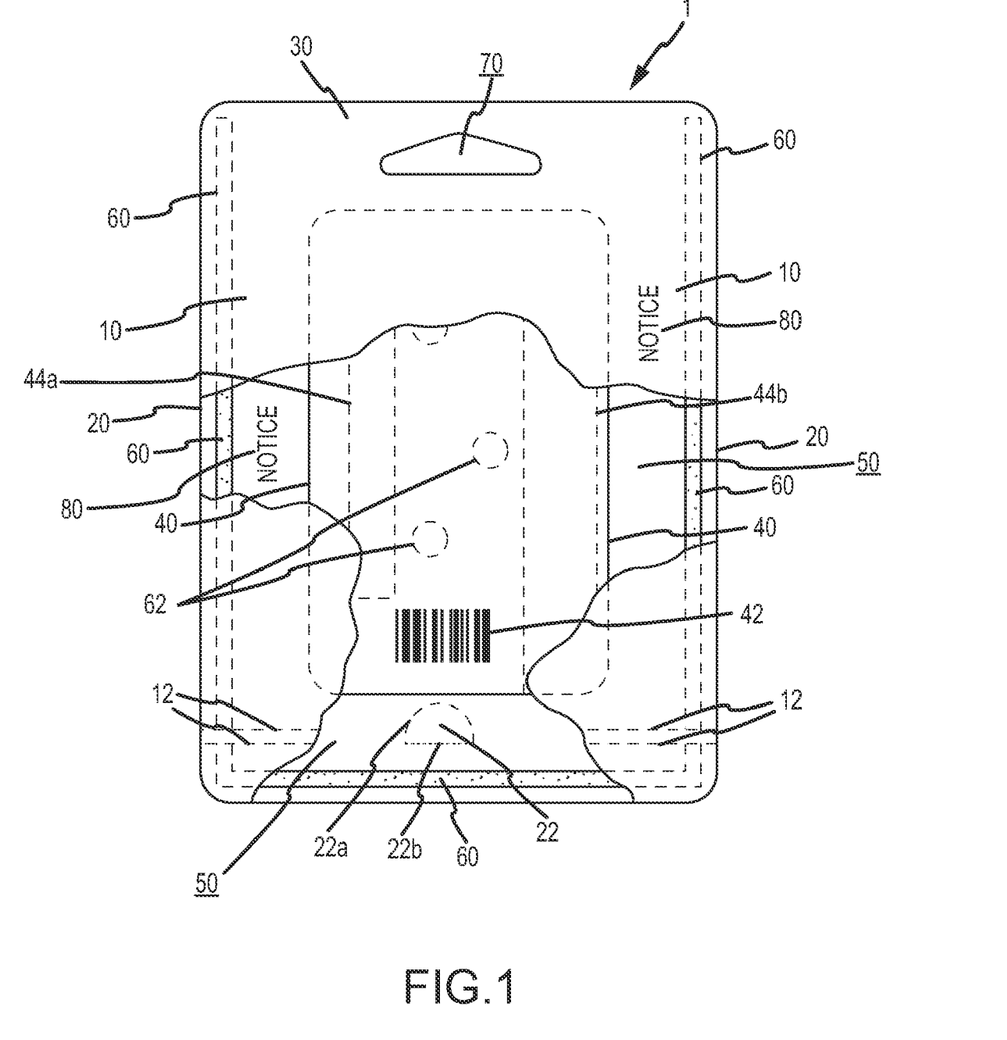
FIG. 1 illustrates one embodiment of a secure card package.

Reference is now made to FIG. 1 which illustrates one embodiment of a secure card package 1. The secure card package 1 includes a first panel 10 disposed in opposing relation to a second panel 20 with a transaction card 40 disposed in an enclosed region 50 defined between opposing portions of the first panel 10 and second panel 20. In FIG. 1, portions of the first panel 10 are cut away to illustrate various features of the secure card package 1.

As shown, the opposing first panel 10 and second panel 20 may be interconnected about at least a portion of their respective peripheries to define the enclosed region 50 within which transaction card 40 is disposed. By way of example, the first panel 10 and second panel 20 may be interconnected by adhesive regions 60 applied to one or both of opposing surface portions of the first panel 10 and second panel 20.

The first panel 10 may include a separable portion 12 that is manipulatable by a user to selectively access the enclosed region 50. By way of example, the separable portion 12 may comprise one or more perforations line(s) extending across the first panel 10, wherein an edge of first panel 10 adjacent to one or both ends of the perforation line(s) may be graspable (e.g. between two fingers of a user) to open the secure card package 1 along the perforation line(s) 12.

In the illustrated embodiment, a pair of perforation lines may comprise the separable portion 12, wherein that portion of the first panel 10 located between the perforation lines may be selectively removed. In turn, the first panel 10 may be separable from the second panel 20 along opposing side edges thereof. That is, the adhesive regions 60 may be provided so that a user may manipulate the first panel 10 so as to detach the first panel 10 from the second panel 20 along the adhesive regions 60 and pivotably move the first panel 10 away from the second panel 20 about a hinge-like adjoinment region 30.

In the approach illustrated in FIG. 1, the first panel 10 and second panel 20 may be integrally defined by a single substrate (e.g., a paperboard substrate) folded to integrally define the adjoinment region 30. In another approach, first panel 10 and second panel 20 may be defined by separate substrates (e.g., two paperboard substrates), wherein the adhesive regions 60 may extend about the entire periphery of opposing panel portions.

Optionally, the second panel 20 may include a tab 22. The tab 22 may be defined by perforation line 22a that may be manipulated (e.g. pushed-out) to allow the tab 22 to be separable from the surrounding portion of second panel 20 along the perforation line 22a. In turn, the tab portion 22 may pivot about an integral hinge region 22b. Such optional tab feature allows for selective retention of the first panel 10 relative to the second panel 20 after separation of the first panel 10 from the second panel 20, thereby yielding an attractive package that may be presented as a gift, etc, after accessing the enclosed region 50. As may be appreciated, the optional tab feature may be utilized in any of the embodiments described herein.

Of note, the transaction card 40 may comprise an activation data field 42 that is only readable to activate the transaction card 40 when the enclosed region 50 of the secure card package 1 is accessed. In this regard, activation data field 42 is located within a concealed region that is defined by a portion of the enclosed region 50. Such concealed region should only be accessed at the time of purchase and attendant card activation at a point-of-sale location.

In turn, concealment of the activation data field 42 reduces tampering risks to a purchaser by reducing any risk that the activation data field 42 may be modified (e.g., by fraudulent application of a label thereupon that presents an activation data field that will function to activate an unintended transaction account) without detection prior to purchase of the secure card package 1. In this regard, one or more human-readable marking(s) may be provided on the secure card package 1 to alert purchasers and/or sales personnel that the concealed region should not reflect any prior opening or other access thereto prior to purchase. For example, in the embodiment shown in FIG. 1, human-readable notices 80 may be provided on the first panel 10 and/or second panel 20 (e.g., "DO NOT COMPLETE TRANSACTION IF PACKAGE PREVIOUSLY OPENED").

The activation data field 42 may comprise a machine-readable marking or a human-readable marking. In the illustrated embodiment, activation data field 42 is defined by a bar code marking. In other embodiments, the activation data field 42 may be defined by a magnetic stripe marking. As may be appreciated, when a machine readable marking (e.g., a bar code or magnetic stripe) is employed to define the activation data field 42, card activation may be automated via machine reading of the activation data field at a point-of-sale location (e.g. at a purchase check-out register). In situations where a human-readable marking is utilized, manual data entry or transfer (e.g., via keyed input and/or telephone) may be employed for activation. In either approach, activation data is communicated to a database controller corresponding with the given transaction card so as to activate the corresponding transaction account so that future transactions utilizing the card may be completed.

Transaction card 40 may include a proprietary account data field 44a and/or 44b comprising information that directly identifies a transaction account (e.g. an account number) and is therefore of a proprietary nature. In the embodiment shown in FIG. 1, the proprietary account data field 44a may comprise alphanumeric or other human-readable data and/or proprietary data account field 44b may be defined by a machine-readable marking, e.g. a barcode or a magnetic stripe (shown in phantom lines), that is directly readable to identify a transaction account.

In certain arrangements a machine-readable marking (e.g., magnetic stripe or a barcode) may be provided on one side of a transaction card (e.g. a side that faces first panel 10 and is therefore exposed upon accessing the concealed region defined by enclosed region 50) or a machine-readable element (e.g. an integrated circuit (IC) chip) may be embedded within a transaction card. In such arrangements, the machine-readable marking or element may be readable to obtain non-proprietary indicator data that may be communicated to and employed by a proprietary database that correlates the indicator data with a specific transaction account to complete a given transaction after card activation. Such feature may be utilized in any of the embodiments described herein.

Of note, proprietary account data fields 44a and 44b may be disposed on a side of the transaction card 40 that faces the second panel 20. In this regard, the second panel 20 may be constructed of a material which renders the account data field 44a and/or 44b unreadable therethrough. In turn, the transaction card 40 may be retained in a first position relative to the second panel 20, wherein the proprietary account data field 44a and/or 44b is unreadable when the enclosed region 50 is accessed and, and wherein the proprietary account data field 44a and/or 44b should not be readable until after removal of the transaction card 40 by a purchaser from the secure card package 1. For example, the transaction card 40 may be detachably interconnected to the second panel 20 via adhesive regions 62 interposed between the transaction card 40 and second panel 20, as shown by phantom lines in FIG. 1.

The retention of transaction card 40 in a position in which a proprietary account data field 44a and/or 44b is unreadable during purchase and activation of the transaction card 40 at a point of sale location further reduces tampering risks to a purchaser. In this regard, one or more human readable marking(s) may be provided on the secure card package 1 to alert purchasers and/or sales personnel that transaction card 40 should be interconnected to second panel 20 upon accessing the enclosed region during activation at a point of sale location. For example, in the embodiment shown in FIG. 1, a human readable notice 80 may be provided on an outside surface on first panel 10 and/or second panel 20 (e.g., "DO NOT COMPLETE TRANSACTION IF CARD PREVIOUSLY DETACHED"). Alternatively or additionally, a human readable notice marking 80 may be provided on an inside surface of first panel 10 and/or second panel 20.

Numerous additional features may be included in the secure card package 1. For example, an aperture 70 may be provided through the first panel 10 and second panel 20 to facilitate removable placement on display a hook or hanger at a point of sale location. Additional optional features may include foil stamping and various printing features that make the secure card package 1 more attractive to prospective purchasers.

In another approach, a secure card package embodiment may be provided as described in relation to FIG. 1 with the following modifications. In particular, one of either the first panel 10 or second panel 20 may be elongated so that a bottom portion thereof may fold around the bottom end of the package to define a flap that detachably connects to the outside of the other one of the panels (e.g. via an adhesive region). Second, an account activation data field may be printed on a concealed region of the flap that is exposable upon selective detachment of the flap for account activation at the time of purchase. In such an arrangement, no activation data field is provided within the enclosed region 50, and the enclosed region 50 may remain unopened until after purchase of the package and activation of the transaction account for the transaction card 40. Again, a human-readable marking may be employed to alert purchasers and/or sales personnel as to potential tampering (e.g., "TRANSACTION SHOULD NOT BE COMPLETED IF FLAP PREVIOUSLY OPENED").

Figure 2:
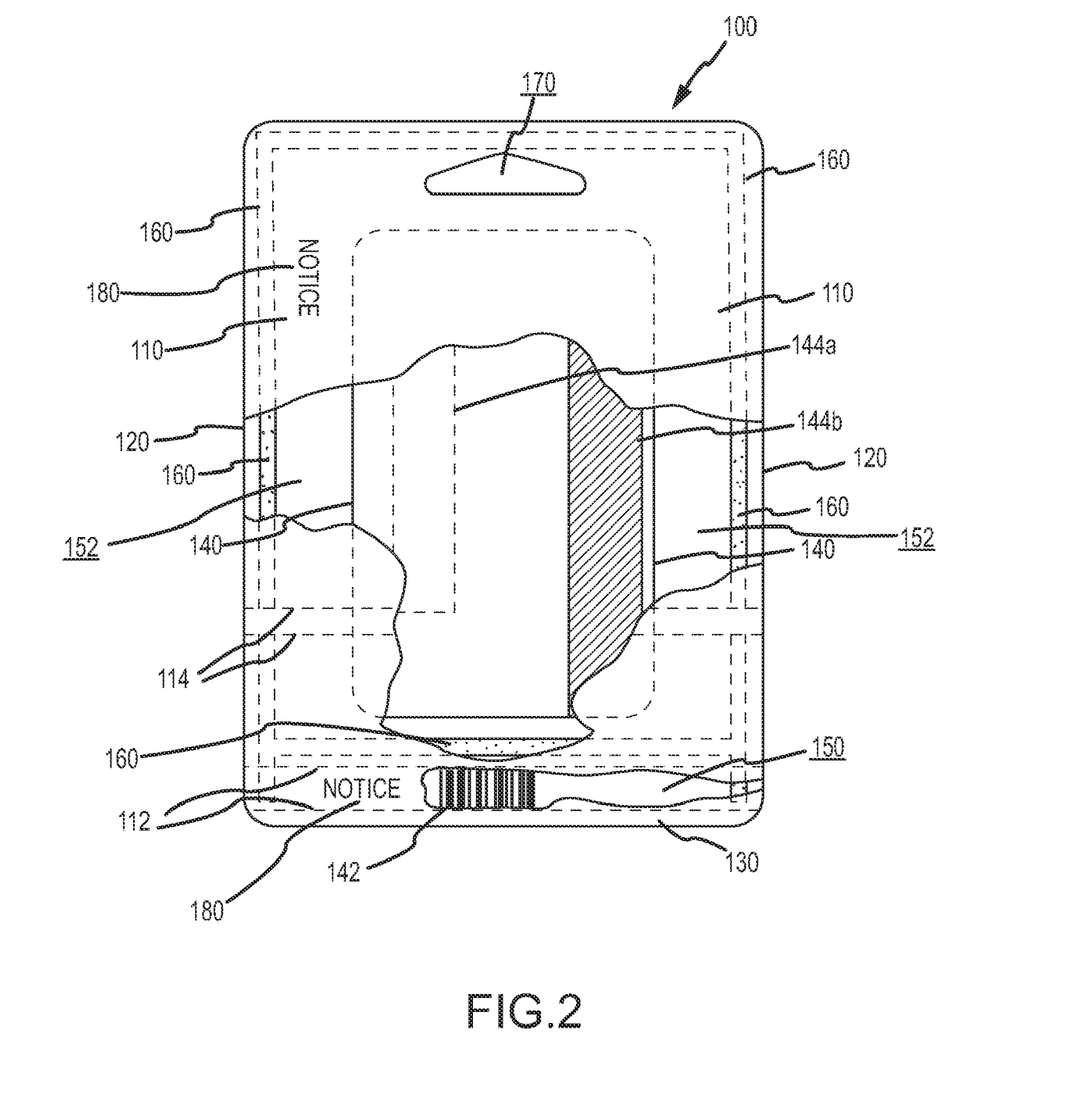
FIG. 2 illustrates another embodiment of a secure card package.

Reference is now made to FIG. 2 which illustrates another embodiment of a secure card package 100. The secure card package 100 includes a first panel 110 disposed in an opposing relation to a second panel 120. The first panel 110 and second panel 120 are interconnected so as to define a plurality of separately accessible enclosed regions therebetween. In FIG. 2, portions of the first panel 110 are cut away to illustrate a first enclosed region 150, a second enclosed region 152 and various additional features of the secure card packaged 100. As will be further described, an activation data field 142 may be located in the first enclosed region 150 and a transaction card 140 may be retainably disposed within the second enclosed region 152, wherein the first enclosed region 150 and second enclosed region 152 are separately accessible.

The opposing first panel 110 and second panel 120 may be interconnected by adhesive regions 160 applied to one or both of opposing surface portions of the first panel 110 and second panel 120 to define the enclosed regions 150 and 152. For example, adhesive regions 160 may be provided about the periphery of the first panel 110 and/or second panel 120, and laterally across the first panel 110 and/or second panel 120 so as to provide for separation of the first enclosed region 150 and second enclosed region 152.

The first panel 110 may include a first separable portion 112 that is manipulable to selectively access the first enclosed region 150. Further, the first panel may include a second separable portion 114 that is manipulable to selectively access the second enclosed region 152.

By way of example, the separable portion 112 and/or the separable portion 114 may comprise one or more perforation line(s) extending across the first panel 110, wherein an edge of the first panel 110 adjacent to one or both ends of the perforation line(s) may be graspable (e.g. between two fingers of a user) to open the secure package 100 along the perforation line(s) 112 and/or 114 to access the enclosed region 150 or second enclosed region 152, respectively. In the embodiment illustrated in FIG. 2, a pair perforation line(s) may comprise the separable portion 112 and a pair of perforation lines may comprise the separation portion 114, wherein that portion of the first panel 110 located between the perforation line(s) may be selectively removed.

In the approach illustrated in FIG. 2, the first panel 110 and second panel 120 may be integrally defined by a single substrate (e.g., a paperboard substrate) folded to integrally define the adjoinment region 130. In another approach, first panel 110 and second panel 120 may be defined by separate substrates (e.g., two paperboard substrates), wherein the adhesive regions 160 may extend about the entire periphery of opposing panel portions As shown in FIG. 2, the activation data field 142 may be provided on that portion of the second panel 120 disposed within the first enclosed region 150. In this regard, the activation data field 142 may be located within a concealed region defined by a portion of the first enclosed region 150. Such activation data field 142 may be readable when the second enclosed region 150 of the secure card package 100 is selectively accessed.

In this regard, the concealed region should only be accessed at the time of purchase and attendant card activation at a point-of-sale location. In turn, concealment of the activation data field 142 may reduce tampering risks to a purchaser by reducing any risk that the activation data field 142 may be modified (e.g., by fraudulent application of a label thereupon that presents an activation data field that will function to activate an unintended transaction account) without detection prior to purchase of the secure card package 100. Upon such detection by sales personnel and/or a consumer, the sale of a tampered package 100 and activation of a corresponding transaction card 140 may be avoided.

Further in this regard, one or more human-readable marking(s) may be provided on the secure card package 100 to alert purchasers and/or sales personnel that the concealed region, or first region 150, should not reflect any prior opening or other access thereto prior to purchase. For example, in the embodiment shown in FIG. 2 human-readable notices 180 may be provided on the first panel 110 and/or second panel 120 (e.g., "DO NOT COMPLETE TRANSACTION IF PACKAGE PREVIOUSLY OPENED").

The activation data field 142 may comprise a machine-readable or a human-readable marking. In the illustrated embodiment, activation data field 142 is defined by a barcode. In other embodiments, the activation data field 142 may be defined by a magnetic stripe. As may be appreciated, when a machine-readable marking (e.g. a barcode or magnetic stripe) is employed to define the activation data field 142, activation of card 140 may be automated via machine reading of the activation data field 142 at a point of sale location (e.g. at a purchase check-out location) and automated data transmission to activation center for automated activation of a corresponding transaction account via an automated database controller. In other applications, the activation data field 142 may be human-readable, wherein manually read data may be conveyed from a point-of-sale location to an activation center for activation of a corresponding transaction account.

Of note, the transaction card 140 of the secure card package 100 illustrated in FIG. 2 may be activated without accessing the second enclosed region 152 within which transaction card 140 is disposed. In this regard, the second enclosed region 152 serves to retainably dispose the transaction card 140 in an enclosed position, wherein no markings or other information disposed on the transaction card 140 is readable during a sale/activation procedure. Such markings may include a human-readable proprietary account data field 144a (shown in phantom lines) and/or a machine-readable proprietary account data field 144b that is readable to directly identify a specific transaction card account.

In this regard, one or more human readable marking(s) may be provided on the secure card package 100 to alert purchasers and/or sales personnel that the second enclosed region 152 should not have been accessed prior to sale. For example, in the embodiment shown in FIG. 2, a human readable notice 180 may be provided on an outside surface on first panel 110 and/or second panel 120 (e.g., "DO NOT COMPLETE TRANSACTION IF PACKAGE PREVIOUSLY OPENED"). Alternatively or additionally, a human readable notice marking 180 may be provided on an inside surface of first panel 110 and/or second panel 120.

Numerous additional features may be included in the secure card package 100. For example, an aperture 170 may be provided through the first panel 110 and second panel 120 to facilitate removable placement on display a hook or hanger at a point of sale location. In certain arrangements a machine-readable element such as a machine-readable marking (e.g., a magnetic stripe or a barcode) or an embedded IC chip may be provided on or within the transaction card 140 that may be readable to obtain non-proprietary indicator data that may be communicated to and employed by a proprietary database that correlates the indicator data with a specific transaction account to complete a given transaction after card activation. Additional optional features may include foil stamping and various printing features that make the secure card package 100 more attractive to prospective purchasers.

Figure 3:
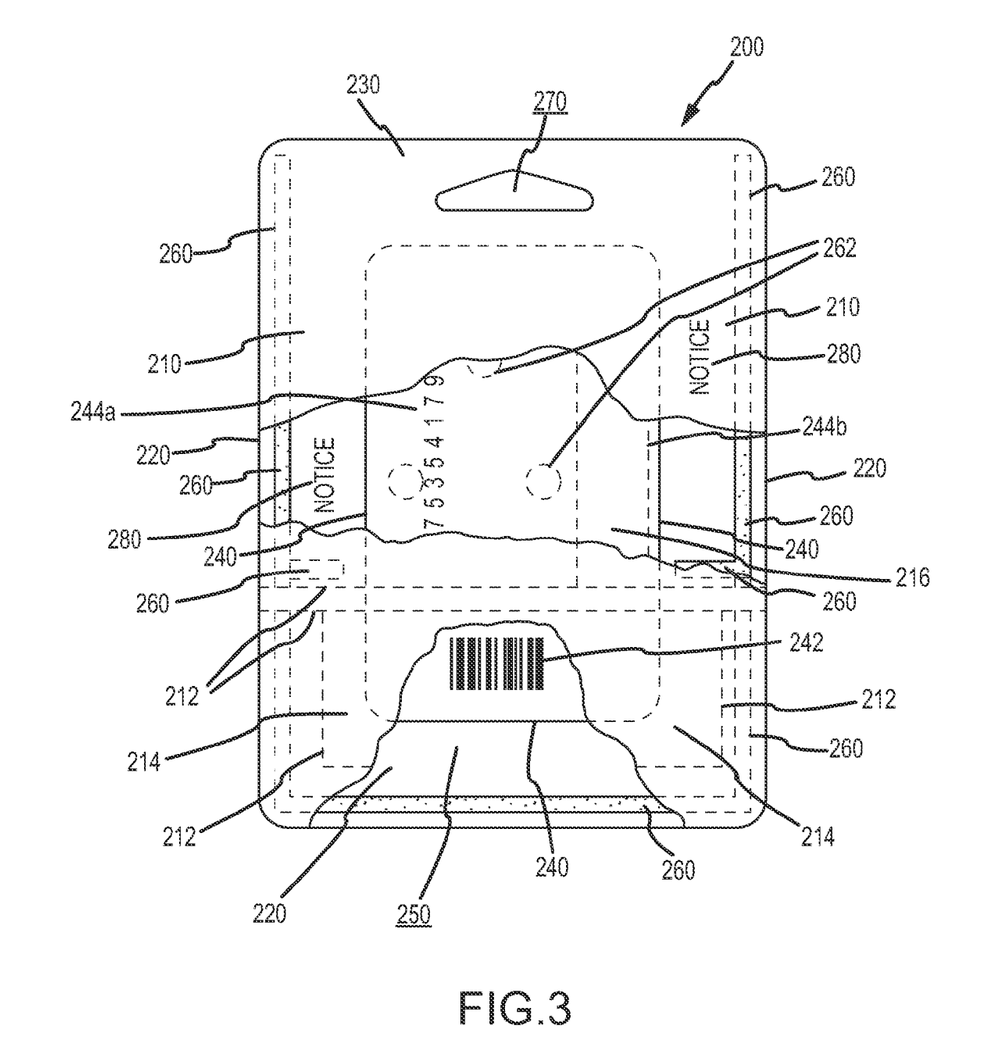
FIG. 3 illustrates an additional embodiment of a secure card package.

Reference is now made to FIG. 3 which illustrates yet another embodiment of a secure card package 200. The secure card package 200 includes a first panel 210 disposed in opposing relation to a second panel 220 with a transaction card 240 disposed in an enclosed region 250 defined between opposing portions of the first panel 210 and second panel 220. In FIG. 3, portions of the first panel 210 are cut away to illustrate various features of the secured card package 200.

As shown, the opposing first panel 210 and second panel 220 may be interconnected about at least a portion of their respective peripheries to define the enclosed region 250 within which transaction card 240 is disposed. By way of example, the first panel 210 and second panel 220 may be interconnected by adhesive regions 260 applied to one or both of opposing surface portions of the first panel 210 and second panel 220.

In the illustrated approach, the first panel 210 and second panel 220 may be integrally defined by a single substrate (e.g., a paperboard substrate) folded to integrally define an adjoinment region 230. In another approach, the first panel 210 and second panel 220 may be defined by separate substrates (e.g., two paperboard substrates), wherein the adhesive region 260 may extend about the entire periphery of opposing panel portions, including opposing edge portions that define the adjoinment region 230.

The first panel 210 may include a separable portion 212 that is manipulable by user to selectively access a limited portion of the enclosed region 250. Such limited portion of the enclosed region may define a concealed region within which an activation data field 242 may be located and selectively accessed.

Such concealed region should only be accessed at the time of purchase and attendant card activation at a point-of-sale location. In turn, concealment of the activation data field 242 reduces tampering risks to a purchaser by reducing any risk that the activation data field 242 may be modified (e.g., by fraudulent application of a label thereupon that presents an activation data field that will function to activate an unintended transaction account) without detection prior to purchase of the secure card package 200. In this regard, one or more human-readable marking(s) may be provided on the secure card package 200 to alert purchasers and/or sales personnel that the concealed region should not reflect any prior opening or other access thereto prior to purchase. For example, in the embodiment shown in FIG. 1, human-readable notices 280 may be provided on the first panel 210 and/or second panel 220 (e.g., "DO NOT COMPLETE TRANSACTION IF PACKAGE PREVIOUSLY OPENED").

In the embodiment shown in FIG. 3, the separable portion 212 may comprise a pair of u-shaped perforation lines extending across the first panel 210 and an adjoining u-shaped perforation line, wherein a portion of the first panel 210 located between the perforation lines may be selectively removed. In particular, a bottom portion 214 of the first panel 210 may be partially or entirely separated from the second panel 220, while leaving a top portion of 216 of first panel 210 interconnected to second panel 220. In turn, the activation data field 242 may be selectively exposed for reading/card activation at a point-of-sale location. The activation data field 242 may comprise a machine-readable or human-readable marking as previously described.

In the embodiment illustrated in FIG. 3, the activation data field 242 is provided on transaction card 240. In a modified version of the FIG. 3 embodiment the activation data field 242 may be provided on a portion of a second panel 220 that underlies the bottom panel portion 214 and is spaced from the edge of transaction card 240, wherein such activation data field 242 may be exposed upon separation of the bottom portion 214 of first panel 210.

In the arrangement shown in FIG. 3, activation data field 242 is shown as barcode. In a modified arrangement, data activation field 242 may be defined by a magnetic stripe, wherein the transaction card is rotated 90 degrees from the position show in FIG. 3 and the first panel 210 and second panel 220 are sized accordingly, and wherein the separable portion 212 is provided so that detachment of bottom portion 214 of the first panel 210 only exposes the magnetic stripe activation data field 242.

As shown in FIG. 3, a proprietary account data field 244a and/or 244b may be provided on a portion of the transaction card 240 that underlies the top portion 216 of first panel 210 and therefore is not exposed or otherwise readable when the concealed region is selectively accessed via detachment of the bottom portion 214 of first panel 210 for card activation at a point-of-sale location. Further in this regard, the transaction card 240 may be detachably interconnected to second panel 220 via adhesive regions 262.

The location of transaction card 240 in a position in which proprietary account data field 244a and/or 244b is unreadable during purchase and activation of the transaction card 240 at a point of sale location further reduces tampering risks to a purchaser. In this regard, one or more human readable marking(s) 280 may be provided on the secure card package 200 to alert purchasers and/or sales personnel that the enclosed region 250 should not reflect any prior opening prior to purchase (e.g., "DO NOT COMPLETE TRANSACTION IF PACKAGE PREVIOUSLY OPENED") and/or that transaction card 240 should not be in a disconnected state upon accessing the concealed region (e.g., "DO NOT COMPLETE TRANSACTION IF CARD PREVIOUSLY DETACHED"). Alternatively or additionally, a human readable notice marking 280 may be provided on an inside surface of first panel 210 and/or second panel 220.

As may be appreciated, after card activation a purchaser may remove transaction card 240 from the package 200. For example, an exposed edge of the top portion 216 of first panel 210 may grasped and pulled away from the second panel 220.

Numerous additional features may be included in the secure card package 200. For example, an aperture 270 may be provided through the first panel 210 and second panel 220 to facilitate removable placement on display a hook or hanger at a point of sale location. In certain arrangements a machine-readable element such as a machine-readable marking (e.g., a magnetic stripe or a barcode) or an embedded IC chip may be provided on or within the transaction card 240 that may be readable to obtain non-proprietary indicator data that may be communicated to and employed by a proprietary database that correlates the indicator data with a specific transaction account to complete a given transaction after card activation.

Additional optional features may include foil stamping and various printing features that make the secure card package 200 more attractive to prospective purchasers.

Figure 4:
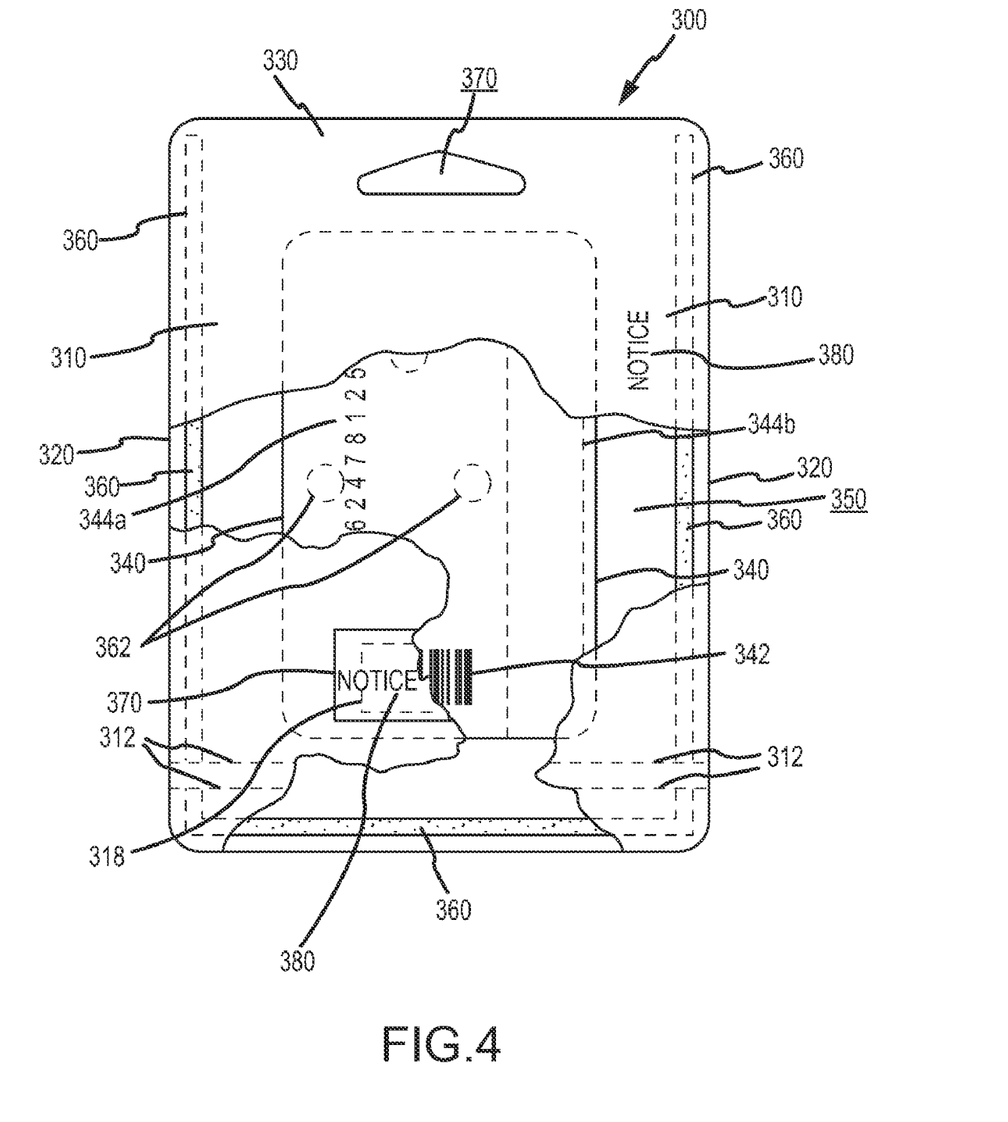
FIG. 4 illustrates a further embodiment of a secure card package.

Reference is now made to FIG. 4 which illustrates yet another embodiment of a secure card package 300. The secure card package 300 includes a first panel 310 disposed in opposing relation to a second panel 320 with a transaction card 340 disposed in an enclosed region 350 defined between opposing portions of the first panel 310 and second panel 320. In FIG. 4, portions of the first panel 310 are cut away to illustrate various features of the secured card package 300.

As shown, the opposing first panel 310 and second panel 320 may be interconnected about at least a portion of their respective peripheries to define the enclosed region 350 within which transaction card 340 is disposed. By way of example, the first panel 310 and second panel 320 may be interconnected by adhesive regions 360 applied to one or both of opposing surface portions of the first panel 310 and second panel 320.

In the illustrated approach, the first panel 310 and second panel 320 may be integrally defined by a single substrate (e.g., a paperboard substrate) folded to integrally define an adjoinment region 330. In another approach, the first panel 310 and second panel 320 may be defined by separate substrates (e.g., two paperboard substrates), wherein the adhesive region 360 may extend about the entire periphery of opposing panel portions, including opposing edge portions that define the adjoinment region 330.

Of note, the secure card package 300 may include a separable portion defined by a removable label 370 that overlies a window 318 (shown in phantom lines), or aperture, through the first panel 310. The removable label 370 may be selectively removed to access a concealed region thereunder and within which an activation data field 342 (e.g. a human-readable or machine-readable marking) may be located and read for card activation.

In this regard, the concealed region should only be accessed at the time of purchase and attendant card activation at a point-of-sale location. In turn, concealment of the activation data field 342 reduces tampering risks to a purchaser by reducing any risk that the activation data field 342 may be modified (e.g., by fraudulent application of a label thereupon that presents an activation data field that will function to activate an unintended transaction account) without detection prior to purchase of the secure card package 300. In this regard, one or more human-readable marking(s) may be provided on the secure card package 300 to alert purchasers and/or sales personnel that the label 370 and underlying concealed region should not reflect any prior removal or other access prior to purchase (e.g., "DO NOT COMPLETE TRANSACTION IF LABEL PREVIOUSLY REMOVED/REPLACED"). For example, in the embodiment shown in FIG. 1, human-readable notices 380 may be provided on the first panel 310 and/or second panel 320 and/or 370.

In the embodiment shown in FIG. 4, the activation data field 342 is provided on the transaction card 340. In turn, the transaction card 340 may be detachably connected to the second panel 320 (e.g., via adhesive patches 362) to facilitate aligned positioning of the activation data field 342 relative to window 318 of the first panel 310. In other approaches, the enclosed region 350 may be sized relative to transaction card 340 and/or the window 318 may be sized relative to activation data field 342 to facilitate aligned positioning of the activation data field 342 and window 318. As may be appreciated, aligned positioning allows activation data field 342 to be read for card activation after removal of label 370 and prior to accessing the enclosed region 350 for removal of transaction card 340 after the purchase of the secure card package 300.

In the later regard, the first panel 310 may include a separable portion 312 that is manipulatable to selectively access the enclosed region 350, e.g. for consumer removal of transaction card 340 after purchase and activation. By way of example, the separable portion 312 may comprise one or more perforations line(s) extending across the first panel 310, wherein an edge of first panel 310 adjacent to one or both ends of the perforation line(s) may be graspable (e.g. between two fingers of a user) to open the secure card package 300 along the perforation line(s) 312.

In the illustrated embodiment, a pair of perforation lines may comprise the separable portion 312, wherein that portion of the first panel 310 located between the perforation lines may be selectively removed. In turn, the first panel 310 may be separable from the second panel 320 along opposing side edges thereof. That is, the adhesive regions 360 may be provided so that a user may manipulate the first panel 310 so as to detach the first panel 310 from the second panel 320 along the adhesive regions 360 and pivotably move the first panel 310 away from the second panel 320 about a hinge-like adjoinment region 330.

As noted, transaction card 340 of the secure card package 300 illustrated in FIG. 4 may be activated without accessing the enclosed region 350 within which transaction card 340 is disposed. In this regard, the enclosed region 350 serves to retainably dispose the transaction card 340 in an enclosed position, wherein no proprietary markings or other information provided on the transaction card 340, other than the activation data field 342, is readable prior to or even during a sale/activation procedure. In particular, a human-readable proprietary account data field 344a (shown in phantom lines) and/or a machine-readable proprietary account data field 344b is not readable for so long as transaction card 340 is disposed in the enclosed region 350.

Further this regard, one or more human readable marking(s) may be provided on the secure card package 300 to alert purchasers and/or sales personnel that the enclosed region 352 should not have been accessed prior to sale. For example, in the embodiment shown in FIG. 4, a human readable notice 380 may be provided on an outside surface on first panel 310 and/or second panel 320 (e.g., "DO NOT COMPLETE TRANSACTION IF PACKAGE OPENED"). Alternatively or additionally, a human readable notice marking 380 may be provided on an inside surface of first panel 310 and/or second panel 320.

Numerous additional features may be included in the secure card package 300. For example, an aperture 370 may be provided through the first panel 310 and second panel 320 to facilitate removable placement on display a hook or hanger at a point of sale location. In certain arrangements a machine-readable element such as a machine-readable marking (e.g., a magnetic stripe or a barcode) or an embedded IC chip may be provided on or within the transaction card 340 that may be readable to obtain non-proprietary indicator data that may be communicated to and employed by a proprietary database that correlates the indicator data with a specific transaction account to complete a given transaction after card activation. Additional optional features may include foil stamping and various printing features that make the secure card package 300 more attractive to prospective purchasers.

Figure 5:
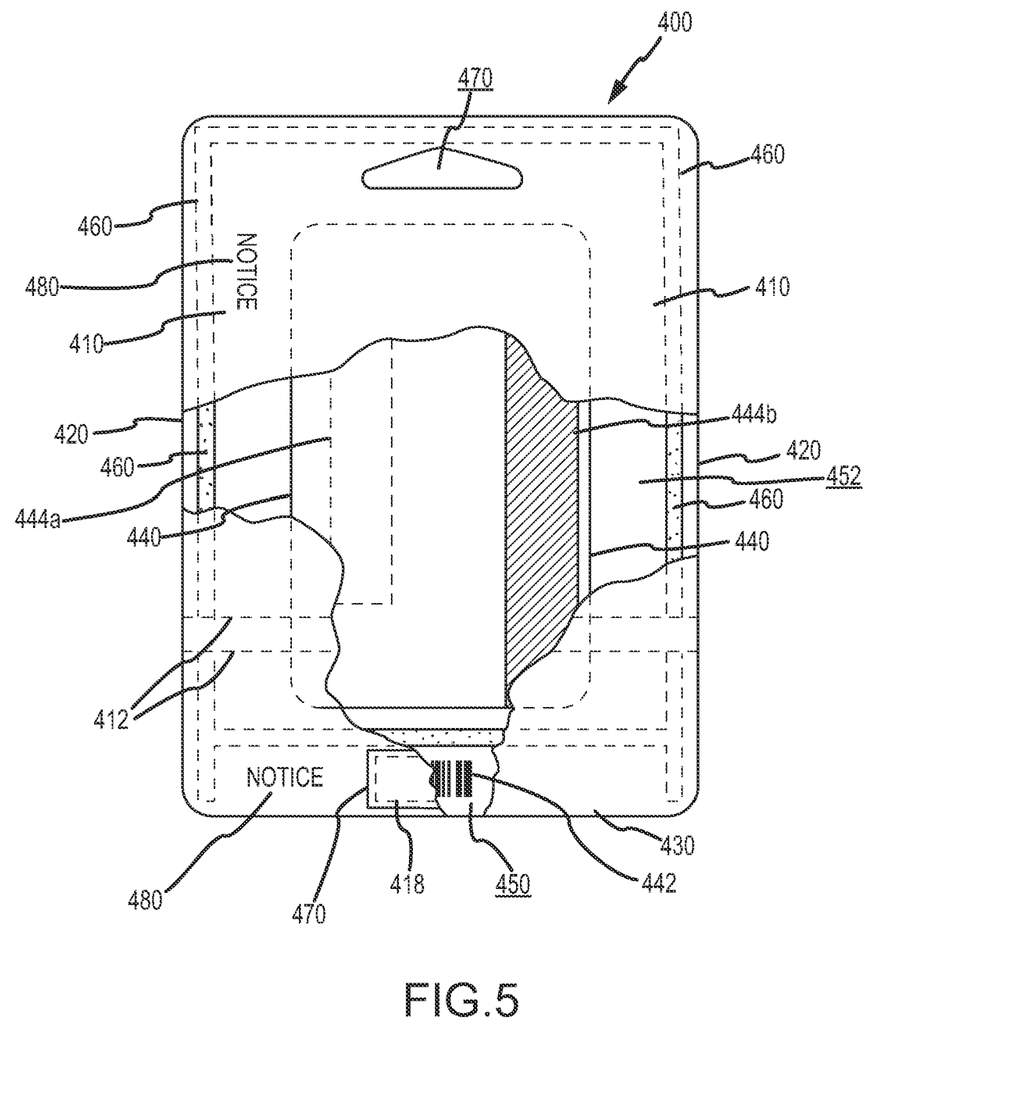
FIG. 5 illustrates yet another embodiment of a secure card package.

Reference is now made to FIG. 5 which illustrates a further embodiment of a secure card package 400. The secure card package 400 includes a first panel 410 disposed in an opposing relation to a second panel 420. The first panel 410 and second panel 420 are interconnected so as to define a plurality of enclosed regions therebetween. In FIG. 5, a portion of the first panel 410 is cut away to illustrate a first enclosed region 450, a second enclosed region 452 and various additional features of the secure card package 400. As will be further described, an activation data field 442 may be disposed within the first enclosed region 450 and a transaction card 440 may be retainably disposed within the enclosed region 452, wherein the second enclosed region 452 may be separated accessible.

The opposing first panel 410 and second panel 420 may be interconnected by adhesive regions 460 applied to one or both of opposing surface portions of the first panel 410 and second panel 420 to define the enclosed regions 450 and 452. For example, adhesive regions 460 may be provided about the periphery of the first panel 410 and/or second panel 420, and laterally across the first panel 410 and/or second panel 420 so as to provide for separation of the first enclosed region 450 and second enclosed region 452.

In the approach illustrated in FIG. 5, the first panel 410 and second panel 420 may be integrally defined by a single substrate (e.g., a paperboard substrate) folded to integrally define the adjoinment region 430. In another approach, first panel 410 and second panel 420 may be defined by separate substrates (e.g., two paperboard substrates), wherein the adhesive regions 460 may extend about the entire periphery of opposing panel portions.

Of note, the secure card package 400 may include a separable portion defined by a removable label 470 that overlies a window 418 (shown in phantom lines), or aperture, through the first panel 410 (shown in phantom lines). The removable label 470 may be selectively removable to access a concealed region thereunder and within which the activation data field 442 may be located on second panel 420.

Such concealed region should only be accessed at the time of purchase and attendant card activation at a point-of-sale location. In turn, concealment of the activation data field 442 reduces tampering risks to a purchaser by reducing any risk that the activation data field 442 may be modified (e.g., by fraudulent application of a label thereupon that presents an activation data field that will function to activate an unintended transaction account) without detection prior to purchase of the secure card package 400. In this regard, one or more human-readable marking(s) may be provided on the secure card package 400 to alert purchasers and/or sales personnel that the label 470 and underlying concealed region should not reflect any prior removal or access, respectively, prior to purchase (e.g., "DO NOT COMPLETE TRANSACTION IF LABEL PREVIOUSLY REMOVED/REPLACED"). For example, in the embodiment shown in FIG. 1, human-readable notices 480 may be provided on the first panel 410 and/or second panel 420 and/or 470.

The first panel 410 may include a separable portion 412 that is manipulable by a user to selectively access the second enclosed region 452 for removal of transaction card 440 after purchase and card activation. By way of example, the separable portion 412 may comprise one or more perforation line(s) extending across the first panel 410, wherein an edge of the first panel 410 adjacent to one or both ends of the perforation line(s) may be graspable (e.g. between two fingers of a user) to open the secure package 400 along the perforation line(s) 412 to access the second enclosed region 452. In the embodiment illustrated in FIG. 2, a pair perforation line(s) may comprise the separable portion 412, wherein that portion of the first panel 410 located between the perforation line(s) may be selectively removed.

As noted, after purchase of secure card package 400, a consumer may selectively remove the transaction card 440 from the enclosed region 452. In this regard, it should be appreciated that, the transaction card 440 of the secure card package 400 illustrated in FIG. 5 may be activated without accessing second enclosed region 452 within which transaction card 440 is disposed. That is, the second enclosed region 452 serves to retainably dispose the transaction card 440 in an enclosed position, wherein no markings or other information disposed on the transaction card 440, is readable during a sale/activation procedure. For example, a human-readable proprietary account data field 444a (shown in phantom lines) and/or a machine-readable proprietary account data field 444b is not readable while the transaction card 440 is disposed in the second enclosed region 452.

In this regard, one or more human readable marking(s) may be provided on the secure card package 400 to alert purchasers and/or sales personnel that the enclosed region 452 should not have been accessed prior to sale. For example, in the embodiment shown in FIG. 5, a human readable notice 480 may be provided on an outside surface on first panel 410 and/or second panel 420 (e.g., "DO NOT COMPLETE TRANSACTION IF PACKAGE OPENED"). Alternatively or additionally, a human readable notice marking 480 may be provided on an inside surface of first panel 410 and/or second panel 420.

Numerous additional features may be included in the secure card package 400. For example, an aperture 470 may be provided through the first panel 410 and second panel 420 to facilitate removable placement on display a hook or hanger at a point of sale location. In certain arrangements a machine-readable element such as a machine-readable marking (e.g., a magnetic stripe or a barcode) or an embedded IC chip may be provided on or within the transaction card 440 that may be readable to obtain non-proprietary indicator data that may be communicated to and employed by a proprietary database that correlates the indicator data with a specific transaction account to complete a given transaction after card activation. Additional optional features may include foil stamping and various printing features that make the secure card package 400 more attractive to prospective purchasers.

Figure 6:
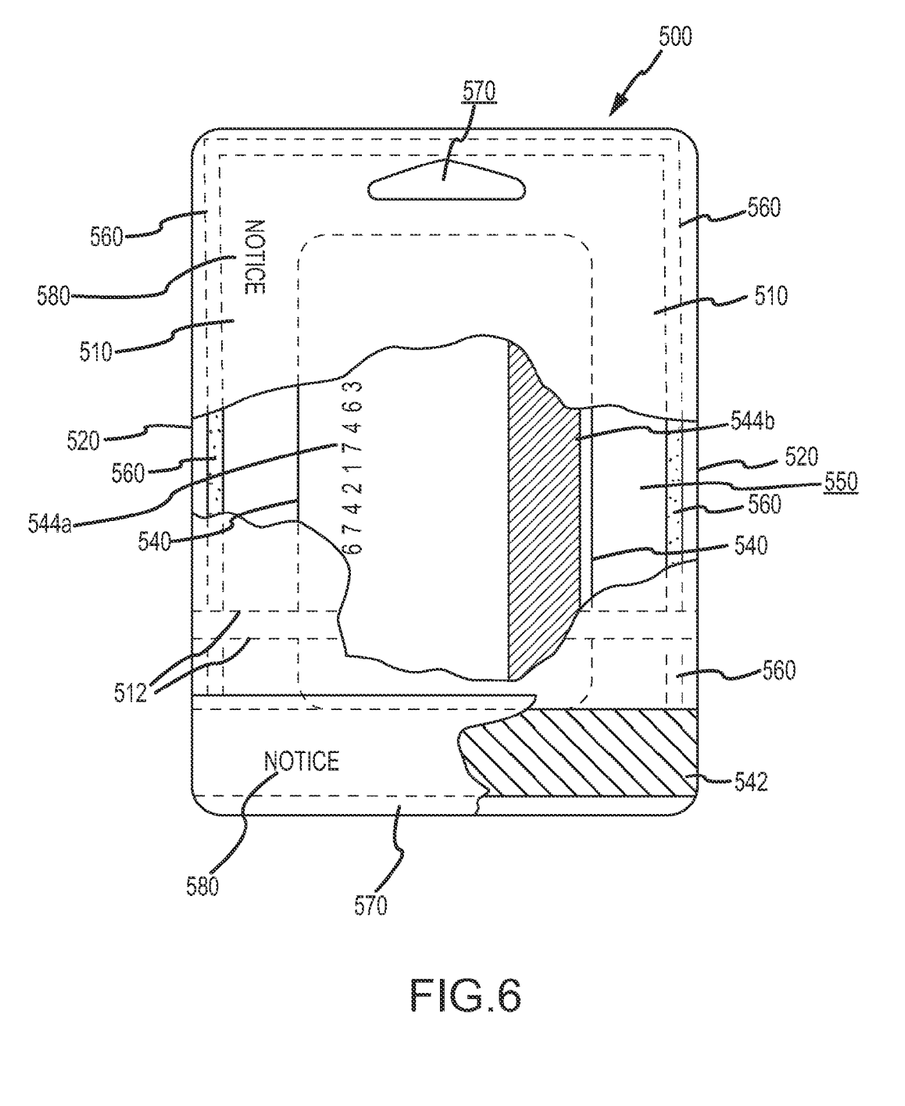
FIG. 6 illustrates yet a further embodiment of secure a card package.

Reference is now made to FIG. 6 which illustrates yet a further embodiment of a secure card package 500. The secure card package 500 includes a first panel 510 disposed in an opposing relation to a second panel 520. The first panel 510 and second panel 520 are interconnected so as to define an enclosed region 550 therebetween. Additionally, a separable portion may be defined by a removable label 570 that is removably attached to the first panel 510 to define a concealed region therebetween. In FIG. 6, portions of the first panel 510 and removable label 570 are cut away to illustrate the enclosed region 550 and the concealed region, respectively, and various additional features of the secure card packaged 500. As will be further described, a transaction card 540 may be retainably disposed within the enclosed region 550 and an activation data field 542 may be located in the concealed region on the first panel 510.

The opposing first panel 510 and second panel 520 may be interconnected by adhesive regions 560 applied to one or both of opposing surface portions of the first panel 510 and second panel 520 to define the enclosed region 550. For example, adhesive regions 560 may be provided about the periphery of the first panel 510 and/or second panel 520.

In the approach illustrated in FIG. 6, the first panel 510 and second panel 520 may be integrally defined by a single substrate (e.g., a paperboard substrate) folded to integrally define the adjoinment region 530. In another approach, first panel 510 and second panel 520 may be defined by separate substrates (e.g., two paperboard substrates), wherein the adhesive regions 560 may extend about the entire periphery of opposing panel portions.

As noted above, the secure card package 500 may include a separable portion defined by a removable label 570 that is removably connected to the first panel 510 to define a concealed region within which an activation data field 542 may be located. The activation data field 542 may comprise a machine-readable marking, e.g. a magnetic stripe as shown or a barcode, or a human-readable marking.

The concealed region should only be accessed at the time of purchase and attendant card activation at a point-of-sale location. In turn, concealment of the activation data field 542 reduces tampering risks to a purchaser by reducing any risk that the activation data field 542 may be modified (e.g., by fraudulent application of a label thereupon that presents an activation data field that will function to activate an unintended transaction account) without detection prior to purchase of the secure card package 500. In this regard, one or more human-readable marking(s) may be provided on the secure card package 500 to alert purchasers and/or sales personnel that the label 570 and underlying concealed region should not reflect any prior removal or access, respectively, prior to purchase (e.g., "DO NOT COMPLETE TRANSACTION IF LABEL PREVIOUSLY REMOVED/REPLACED"). For example, in the embodiment shown in FIG. 1, human-readable notices 580 may be provided on the first panel 510 and/or second panel 520 and/or 570.

The first panel 510 may include a separable portion 512 that is manipulable by a to selectively access the enclosed region 550, e.g. after purchase and card activation. By way of example, the separable portion 512 may comprise one or more perforation line(s) extending across the first panel 510, wherein an edge of the first panel 510 adjacent to one or both ends of the perforation line(s) may be graspable (e.g. between two fingers of a user) to open the secure package 500 along the perforation line(s) 512 to access the enclosed region 550. In the embodiment illustrated in FIG. 6, a pair perforation line(s) may comprise the separable portion 512, wherein that portion of the first panel 510 located between the perforation line(s) may be selectively removed.

It should be appreciated that the transaction card 540 of the secure card package 500 illustrated in FIG. 6 may be activated without accessing second enclosed region 552 within which transaction card 540 is disposed. That is, the second enclosed region 552 serves to retainably dispose the transaction card 540 in an enclosed position, wherein no markings or other information disposed on the transaction card 540 are readable during a sale/activation procedure. In particular, a human-readable proprietary account data field 544a (shown in phantom lines) and/or a machine-readable account data field 544b is not readable while the transaction card 540 is disposed in the second enclosed region 552.

In this regard, one or more human readable marking(s) may be provided on the secure card package 500 to alert purchasers and/or sales personnel that the enclosed region 552 should not have been accessed prior to sale (e.g., "DO NOT COMPLETE TRANSACTION IF PACKAGE OPENED"). For example, in the embodiment shown in FIG. 6, a human readable notice 580 may be provided on an outside surface on first panel 510 and/or second panel 520. Alternatively or additionally, a human readable notice marking 580 may be provided on an inside surface of first panel 510 and/or second panel 520.

Numerous additional features may be included in the secure card package 500. For example, an aperture 570 may be provided through the first panel 510 and second panel 520 to facilitate removable placement on display a hook or hanger at a point of sale location. In certain arrangements a machine-readable element such as a machine-readable marking (e.g., a magnetic stripe or a barcode) or an embedded IC chip may be provided on or within the transaction card 540 that may be readable to obtain non-proprietary indicator data that may be communicated to and employed by a proprietary database that correlates the indicator data with a specific transaction account to complete a given transaction after card activation. Additional optional features may include foil stamping and various printing features that make the secure card package 500 more attractive to prospective purchasers.

Figure 7:
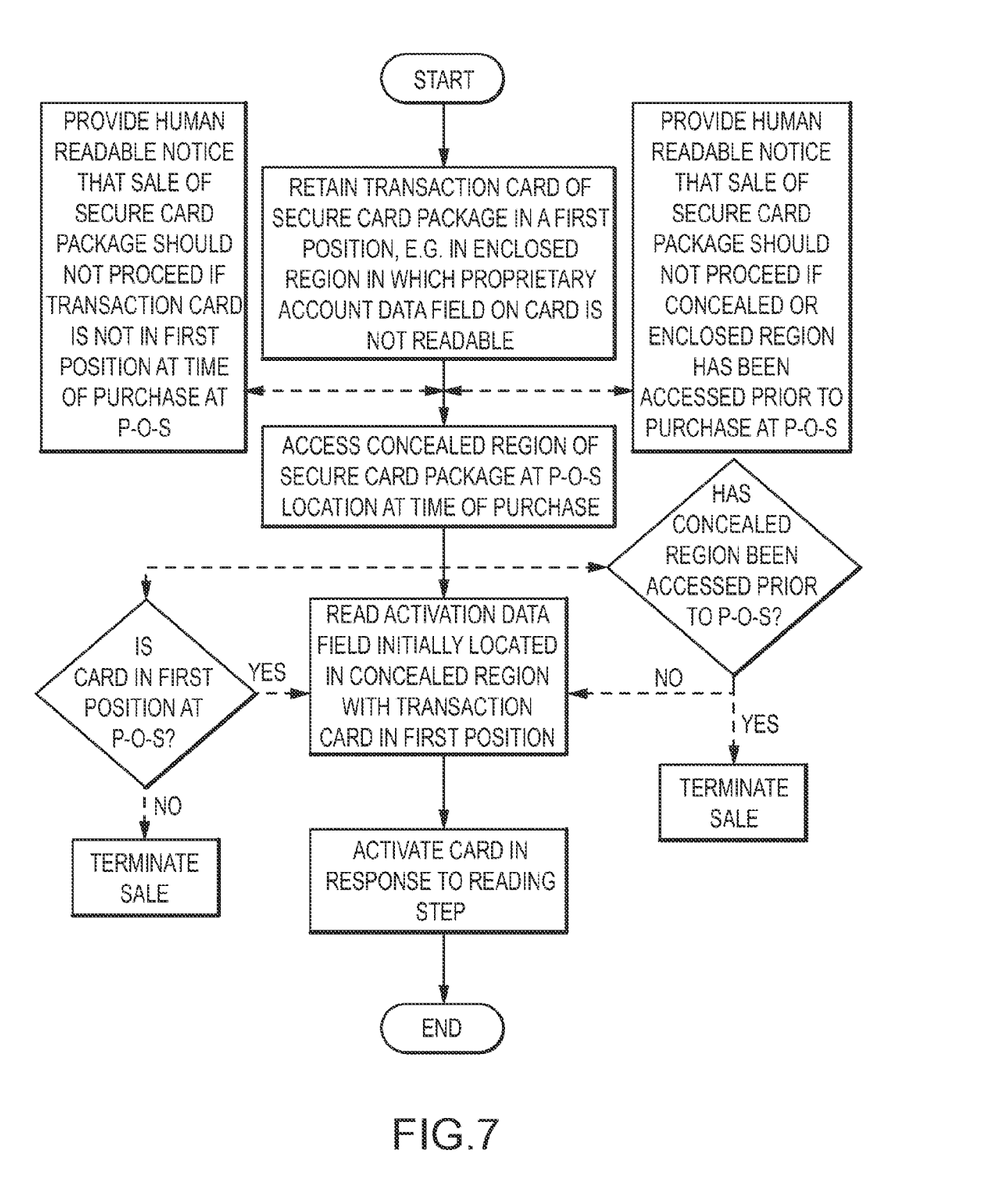
FIG. 7 illustrates a method embodiment of a method for handling a secure card package at a point of sale location.

Reference is now made to FIG. 7 which illustrates one embodiment of a method for handling a secure card package at a point-of-sale location. By way of example, but not limitation, the secure card packages 1, 100, 200, 200, 400 or 500 described hereinabove may be utilized in the method embodiment.

As illustrated, the method may include the step of retaining a transaction card of a secure card package in a first position in which a proprietary account data field located in the card is not readable. In relation to the secure card package 1 described above, retention of the corresponding transaction card 40 in such first position is achieved via adhesive interconnection of the transaction card 40 to a portion of second panel 20. In the secure card package 100 described above, the corresponding transaction card 140 is retained in a first position via enclosure within the second enclosed region 152. Numerous additional approaches may utilized for retention of a transaction card in a first position in which proprietary account data on a card is not readable.

As further shown in FIG. 7, the method embodiment may include the step of accessing an enclosed concealed region of a secure card package at a point-of-sale location. Such accessing step may comprise manipulating a separable portion of a secure card package, e.g. separable portion 12, separable portion 112, separable portion 212, removable label 370, removable label 470, or removable label 570 of secure card packages 1, 100, 200, 300, 400 and 500, respectively, as described above.

As shown in FIG. 7, the method embodiment may further provide for reading an activation data field initially located within the concealed region after access to the concealed region has been gained and with the transaction card maintained in the first position. In response to such reading step, the transaction card may be activated.

The method may include a further optional step of determining whether the transaction card has been maintained in a first position at a point-of-sale location, e.g., via visual inspection of the package. If not, tampering is indicated and the transaction should be terminated.

The method may also optionally provide for determining whether the concealed region has been accessed prior to access at the point-of-sale location (e.g., via inspection prior or at a purchase check-out location). If the concealed region has been previously accessed, tampering is indicated and the transaction should be terminated.

In relation to the above-noted determinations, the method may also optionally provide for the provision of human-readable notices. In one approach, a notice may be provided that indicates that a sale of the secure card package should not proceed if the transaction card is not in the above-noted first position at the point-of-sale location (e.g., at the purchase check-out location). Additionally, or alternatively, a human readable notice may provide an indication that the sale of a secure card package should not proceed if the concealed region thereof has been accessed prior to access at a point-of-sale location (e.g., the purchase check-out location).

The embodiment descriptions provided hereinabove are for purposes of illustration. Various additional embodiments and extensions of the present invention will be apparent to those skilled in the art and are intended to be within the scope of the claims which follow.

What is claimed is:

1. A secure card package comprising:
   a concealed region;
   a transaction card retainably disposed so that a proprietary account data field on the transaction card is not readable when the concealed region is selectively accessed;
   an enclosed region, wherein said transaction card is located in said enclosed region, wherein said concealed region is at least partially defined by at least a portion of said enclosed region, and wherein said enclosed region is selectively accessible;
   an activation data field located within the concealed region on a panel portion separate from said transaction card, wherein the activation data field is readable to activate the transaction card when the concealed region is selectively accessed;
   another panel portion having a window therethrough and aligned with said activation data field; and,
   a separable portion manipulatable for selectively accessing the concealed region, the separable portion being defined by a removable label overlying said window.

2. A secure card package as recited in claim 1, wherein said concealed region is defined by said enclosed region.

3. A secure card package as recited in claim 1, wherein said activation data field comprises one of:
   a machine-readable marking; and,
   a human-readable marking.

4. A secure card package as recited in claim 1, further comprising:
   opposing first and second panels for defining at least a portion of the enclosed region.

5. A secure card package as recited in claim 4, wherein said opposing first and second panels are integrally interconnected along an adjoinment region.

6. A secure card package as recited in claim 4, wherein said separable portion is located on one of said first and second panels.

7. A secure card package as recited in claim 1, wherein said transaction card is detachably connected to an opaque panel portion within said enclosed region, and wherein said proprietary account data field is disposed in face-to-face relation to the opaque panel portion.

8. A secure card package as recited in claim 1, wherein said concealed region and said enclosed region are separately accessible.

9. A secure card package comprising:
   a concealed region;
   a separable portion manipulatable for selectively accessing the concealed region;
   a transaction card retainably disposed so that a proprietary account data field on the transaction card is not readable when the concealed region is selectively accessed;
   an enclosed region, wherein said transaction card is located in said enclosed region, and wherein said enclosed region is selectively accessible;
   an activation data field located within the concealed region on a panel portion separate from said transaction card, wherein the activation data field is readable to activate the transaction card when the concealed region is selectively accessed;
   opposing first and second panels for defining at least a portion of the enclosed region, wherein said separable portion is provided so that said opposing portions of first and second panels are pivotable relative to one another when said enclosed region is selectively accessed by manipulation of the separable portion, wherein said opposing portions of said first and second panels are pivotably interconnected and selectively positionable in an open, side-by-side position and in a closed, face-to-face position; and
   wherein at least a first one of said opposing portions comprises
   a tab for selectively retaining a second one of the opposing portions in said closed, face-to-face position.

10. A secure card package as recited in claim 9, wherein said concealed region and said enclosed region are separately accessible.

11. A secure card package as recited in claim 9, wherein said separable portion includes at least one of:
    a perforated panel portion;
    a pull panel portion; and,
    a removable label.

12. A secure card package comprising:
    a concealed region;
    a separable portion manipulatable for selectively accessing the concealed region;
    a transaction card retainably disposed so that a proprietary account data field on the transaction card is not readable when the concealed region is selectively accessed;
    an enclosed region, wherein said transaction card is located in said enclosed region, wherein said concealed region is at least partially defined by at least a portion of said enclosed region, and wherein said enclosed region is selectively accessible;
    an activation data field located within the concealed region on a panel portion separate from said transaction card, wherein the activation data field is readable to activate the transaction card when the concealed region is selectively accessed; and,
    wherein said separable portion is manipulatable to separate a first panel into a first portion and a second portion, and wherein said first portion is manipulatable to access the concealed region with the second portion positioned to render the proprietary account data field unreadable.

13. A secured card package, comprising:
    a concealed region;
    a transaction card retainably disposed so that a proprietary account data field on the transaction card is not readable when the concealed region is selectively accessed;
    an enclosed region, wherein said transaction card is located in said enclosed region, and wherein said enclosed region is selectively accessible;
    an activation data field located within the concealed region on a panel portion separate from said transaction card, wherein the activation data field is readable to activate the transaction card when the concealed region is selectively accessed;
    another panel portion having a window therethrough and aligned with said activation data field; and,
    a separable portion manipulatable for selectively accessing the concealed region, the separable portion being defined by a removable label overlying said window; and,
    wherein said concealed region and said enclosed region are separately accessible, and wherein said concealed region is separate from said enclosed region.

14. A secure card package comprising:
a concealed region;
a separable portion manipulatable for selectively accessing the concealed region;
a transaction card retainably disposed so that a proprietary account data field on the transaction card is not readable when the concealed region is selectively accessed;
an enclosed region, wherein said transaction card is located in said enclosed region, and wherein said enclosed region is selectively accessible;
an activation data field located within the concealed region on a panel portion separate from said transaction card, wherein the activation data field is readable to activate the transaction card when the concealed region is selectively accessed;
another panel portion having a window therethrough and aligned with said activation data field; and,
a removable label overlying said window to define said separable portion.

15. A secure card package comprising:
a concealed region;
a transaction card retainably disposed so that a proprietary account data field on the transaction card is not readable when the concealed region is selectively accessed;
an activation data field located within the concealed region on a panel portion separate from said transaction card, wherein the activation data field is readable to activate the transaction card when the concealed region is selectively accessed;
another panel portion having a window therethrough and aligned with said activation data field; and,
a separable portion manipulatable for selectively accessing the concealed region, the separable portion being defined by a removable label overlying said window.

16. A secure card package as recited in claim 15, wherein said activation data field comprises one of:
a machine-readable marking; and,
a human-readable marking.

17. A secure card package as recited in claim 15, further comprising:
an enclosed region, wherein said transaction card is located in said enclosed region, and wherein said enclosed region is selectively accessible.

18. A secure card package as recited in claim 17, further comprising:
opposing first and second panels for defining at least a portion of the enclosed region.

19. A secure card package as recited in claim 18, wherein said opposing first and second panels are integrally interconnected along an adjoinment region.

20. A secure card package as recited in claim 18, wherein said separable portion is located on one of said first and second panels.

21. A secure card package as recited in claim 18, wherein said separable portion is provided so that said opposing portions of first and second panels are pivotable relative to one another when said enclosed region is selectively accessed by manipulation of the separable portion.

22. A secure card package as recited in claim 21, wherein at least a first one of said opposing portions comprises:
a tab for selectively retaining a second one of the opposing portions in said closed, face-to-face position.

23. A secure card package as recited in claim 17, wherein said concealed region is at least partially defined by at least a portion of said enclosed region.

24. A secure card package as recited in claim 15, wherein said transaction card is detachably connected to an opaque panel portion within said enclosed region, and wherein said proprietary account data field is disposed in face-to-face relation to the opaque panel portion.

25. A secure card package as recited in claim 17, wherein said concealed region is separate from said enclosed region.

26. A secure card package as recited in claim 17, wherein said concealed region and said enclosed region are separately accessible.

* * * * *